(12) United States Patent
Sørensen

(10) Patent No.: US 11,060,036 B2
(45) Date of Patent: Jul. 13, 2021

(54) PROCESS FOR THE CONVERSION OF OXYGENATES TO C5+ HYDROCARBONS BOILING IN THE GASOLINE BOILING RANGE

(71) Applicant: Haldor Topsøe A/S, Kgs. Lyngby (DK)

(72) Inventor: Martin Dan Palis Sørensen, Taastrup (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 17/040,863

(22) PCT Filed: May 2, 2019

(86) PCT No.: PCT/EP2019/061248
§ 371 (c)(1),
(2) Date: Sep. 23, 2020

(87) PCT Pub. No.: WO2019/219397
PCT Pub. Date: Nov. 21, 2019

(65) Prior Publication Data
US 2021/0002557 A1    Jan. 7, 2021

(30) Foreign Application Priority Data

May 15, 2018    (DK) .......................... PA 2018 00214

(51) Int. Cl.
*C10G 3/00*    (2006.01)
(52) U.S. Cl.
CPC .................. *C10G 3/60* (2013.01); *C10G 3/49* (2013.01); *C10G 2300/4006* (2013.01);
(Continued)
(58) Field of Classification Search
None
See application file for complete search history.

(56) References Cited

U.S. PATENT DOCUMENTS 4,338,475 A    7/1982    Pennington et al.
4,387,263 A    6/1983    Vogt et al.
(Continued)

FOREIGN PATENT DOCUMENTS

EP         2 036 970 A2    3/2009
WO    WO 2017/173165 A1   10/2017

*Primary Examiner* — Philip Y Louie
(74) *Attorney, Agent, or Firm* — Blank Rome LLP

(57) ABSTRACT

Process for the conversion of oxygenates to $C_{5+}$ hydrocarbons boiling in the gasoline boiling range, comprising the steps of continuously a) providing one or more feed streams of one or more oxygenate compounds; b) heating the one or more feed streams to an inlet temperature of one or more downstream conversion reactors; c) introducing the one or more heated feed stream into inlet of the one or more conversion reactors; d) converting in the one or more conversion reactors the one or more heated feed stream in presence of catalyst to a converted oxygenate product comprising $C_{5+}$ hydrocarbons; e) withdrawing from the one or more conversion reactors the converted oxygenate product; f) determining at outlet of the one or more conversion reactors amount of the one or more unconverted oxygenate compounds in the withdrawn converted oxygenate product; g) separating the converted oxygenate product into a $C_{4-}$ hydrocarbon fraction, a fraction with the $C_{5+}$ hydrocarbons boiling in the gasoline boiling range and a fraction comprising water and the one or more unconverted oxygenate compounds, wherein the inlet temperature of the one or more feed streams in step b is continuously adjusted to maintain a constant amount of the one or more unconverted oxygenate compounds as determined in step f.

10 Claims, 5 Drawing Sheets

(52) U.S. Cl.
CPC ............... *C10G 2300/4025* (2013.01); *C10G 2300/708* (2013.01); *C10G 2400/02* (2013.01)

(56) References Cited

U.S. PATENT DOCUMENTS

| | | |
|---|---|---|
| 4,814,535 A | 3/1989 | Yurchak |
| 4,814,536 A | 3/1989 | Yurchak |
| 5,059,738 A * | 10/1991 | Beech, Jr. ................ B01J 29/90 585/469 |
| 6,552,240 B1 | 4/2003 | Lattner et al. |
| 2017/0253807 A1 | 9/2017 | Knudsen et al. |

\* cited by examiner

A: Operation according to the invention

B: Standard operation

PROCESS FOR THE CONVERSION OF OXYGENATES TO C5+ HYDROCARBONS BOILING IN THE GASOLINE BOILING RANGE

The present invention relates to improvements in a process for the conversion of oxygenates to C5+ hydrocarbons, such as the methanol-to-gasoline (MTG) process.

The MTG process is well known and has be employed in the industry for many years. The main process step in this process is the conversion of methanol to hydrocarbons by contact with a zeolitic catalyst in a fixed bed or fluid bed conversion reactor to the desired C5+ gasoline product and byproduct with $C_{4-}$ hydrocarbons and water with unconverted methanol.

The oxygenate-to-hydrocarbon processes are in general characterized by deactivation of the catalyst due to deposition of carbonaceous species (coke), which is a natural part of the hydrocarbon chemistry over zeolite based catalysts. The deposition of coke deactivates the catalyst by covering the active sites as well as pore blockage and increased diffusion limitation. The loss of activity due to the continuous coking process decreases the methanol conversion rate, and the methanol conversion will therefore decrease as a function of time on stream. At some point, the methanol slip will be too large, and the reactor must be taken out of service, and the catalyst regenerated by burning off the coke using a stream containing air. In commercial application, a continuous production of the gasoline product thus requires a multiple reactor system, where the reactors are operating in cyclic shifts between reaction and regeneration modes.

Conventionally, the reactors operate with a relatively high inlet temperature, typically in the range of 338-370° C., with a constant temperature increase over the catalyst bed of typically 50-100° C., where the temperature increase is controlled by the flow rate of recycle gas used to dilute the inlet methanol feed. The temperature level is chosen to ensure a methanol conversion of at least 99.9%. The strict requirements to the high methanol conversion, is largely for economic reasons related to the cost of the waste water treatment system, where the unconverted methanol is removed from the process water.

When operating the gasoline reactors at oxygenate conversions lower than 99.9%, several surprising benefits have been found, such as maximized gasoline production, more stable product quality, longer cycle lengths, and increased ultimate catalyst lifetime.

In the present invention, the average catalyst bed temperature is manipulated by adjusting the inlet temperature into the catalyst bed to target optimal reactor pass gasoline yield (irrespectively to the aforementioned methanol recovery).

It has been found from pilot plant operation, that the optimal gasoline yield is not found at 100% oxygenate conversion, but always at lower oxygenate conversions. The gasoline yield over the synthesis converter is given by the general relation—taking methanol as an example:

$$y(C5+) = XMeOH \cdot S(C5+)$$

where XMeOH is the methanol conversion, and S(C5+) is the gasoline selectivity.

Whereas methanol conversion is increasing when the reaction temperature is increased (or in general when the catalyst activity is high), the gasoline selectivity decreases. The reason why the gasoline selectivity decreases, is because of the occurrence of secondary cracking reactions. Especially iso-paraffins are catalytically cracked to form hydrocarbon products outside the boiling range of gasoline. As the gasoline yield is defined as the product of the methanol conversion and the gasoline selectivity, it invariably means, that there must be an optimum in the gasoline yield as a function of the methanol conversion. The invention aims to operate the reactor at this optimum (or in its proximity).

It is one objective of the present invention to optimize the gasoline yield and thereby significantly improve the production capacity in the oxygenate to gasoline process.

Another objective is to ensure stable product distribution, and therefore stable gasoline characteristics, such as the octane number, throughout the oxygenate to gasoline reaction periods.

Further objectives of the present invention are to significantly improve both the absolute catalyst life time, but surprisingly also to improve the average cycle lengths, thereby increasing the efficiency of the process and the catalyst.

Pursuant to the above objects and findings, this invention provides an improved Process for the conversion of oxygenates to C5+ hydrocarbons boiling in the gasoline boiling range, comprising the steps of continuously a) providing one or more feed streams of one or more oxygenate compounds;
b) heating the one or more feed streams to an inlet temperature of one or more downstream conversion reactors;
c) introducing the one or more heated feed stream into inlet of the one or more conversion reactors;
d) converting in the one or more conversion reactors the one or more heated feed stream in presence of catalyst to a converted oxygenate product comprising C5+ hydrocarbons;
e) withdrawing from the one or more conversion reactors the converted oxygenate product;
f) determining at outlet of the one or more conversion reactors amount of the one or more unconverted oxygenate compounds in the withdrawn converted oxygenate product;
g) separating the converted oxygenate product into a C4− hydrocarbon fraction, a fraction with the C5+ hydrocarbons boiling in the gasoline boiling range and a fraction comprising water and the one or more unconverted oxygenate compounds, wherein the inlet temperature of the one or more feed streams in step b is continuously adjusted to maintain a constant amount of the one or more unconverted oxygenate compounds as determined in step f.

Catalysts for the oxygenate conversion to gasoline are well known in the art and include various zeolites.

Operating various zeolite catalysts under industrial relevant conditions in a pilot plant, data have been collected to show typical correlations between the gasoline yield and the methanol conversion.

BRIEF DESCRIPTION OF THE DRAWINGS

FIG. 1 shows such examples, where the data covers both fresh and aged zeolite activity. The pilot plant data show, that the location of the optimum production changes position as the catalyst changes activity, but in all cases the optimum is confined in a conversion range of 95-99.9%. From 99.9% and up to 100% conversion, there is a sharp drop in gasoline yield, whereas the optimum is rather flat going towards lower conversions. The methanol conversion may be monitored during the MTG reaction period, by continuously measuring the methanol slip in the converter effluent, using a method of analysis working online, e.g. application of gas chromatography or inferred methods.

Thus, in a preferred embodiment of the invention inlet temperature of the one or more feed streams is continuously adjusted to maintain a constant level of conversion one or more oxygenate compounds between 95%-99.9%.

In further a preferred embodiment of the invention, the inlet temperature of the one or more feed streams in step b is continuously increased or decreased to maintain a conversion of the one or more oxygenate compounds at a constant level in step d.

The strategy for product rate optimization in accordance with the invention, requires continuous temperature adjustment, in order to counteract coking and maintain the conversion at the selected working point, e.g. at 99% corresponding to about 700 vol. ppm methanol in the reactor effluent, at an RM ratio of about 8.5 mole/mole. The online analysis data of the converter effluent (e.g. the methanol slip) form the basis for input to an online feed-back controller, adjusting the inlet temperature to the converter in order to maintain the desired conversion level.

Figure 1:
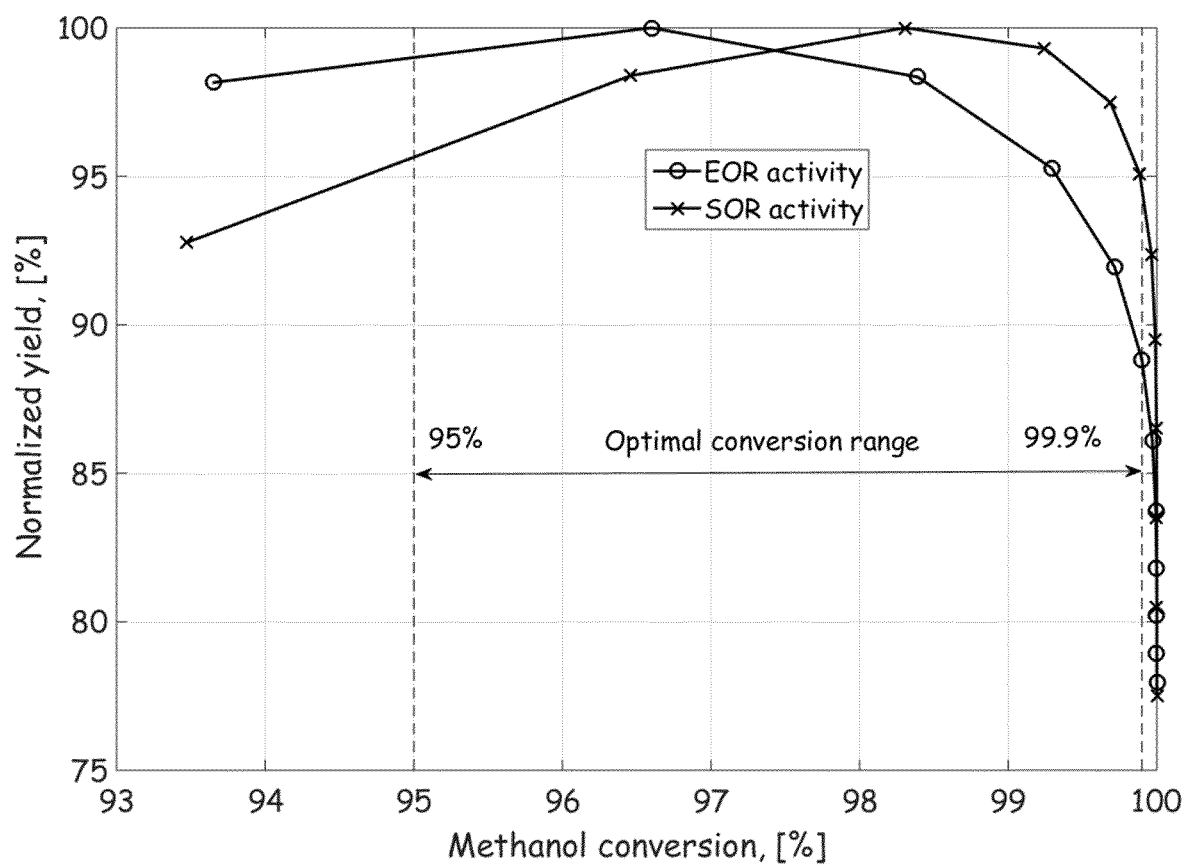
FIG. 1: Normalized yield of $C_{5+}$ vs conversion for SOR and EOR catalyst activity. Data from kinetic investigation in pilot plant. Clear optima in yield can be observed. The conversion corresponding to the optimum is shifted when the catalyst is aged. Optimal production is however ensured in the conversion range 95-99.9%. Note operating the reactor at conversion >99.9% results in significant yield loss.
Figure 2:
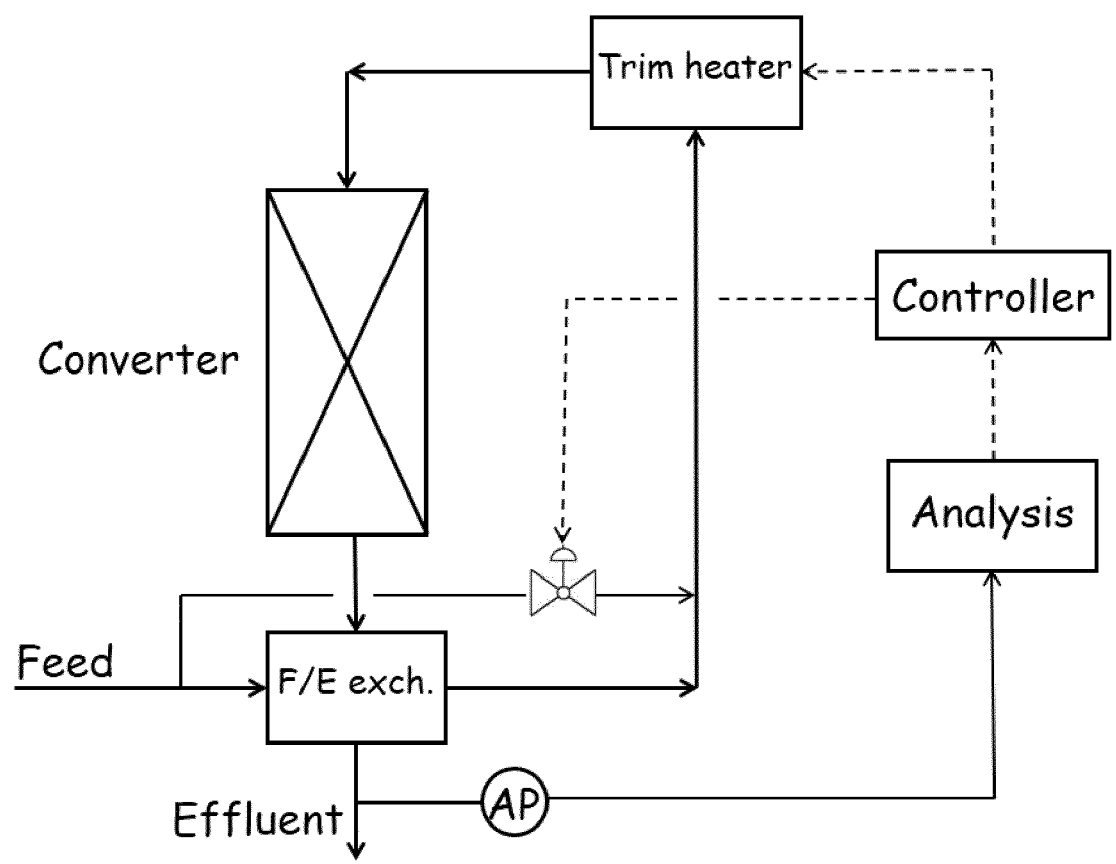
FIG. 2: Sketch illustrating the control principle. The inlet temperature is adjusted (e.g. by a by-pass over a feed/effluent heat exchanger, or by a trim heater), and the control action is determined from online analysis data of the converter effluent.

The controlling feed-back action can either be to the actuator controlling the by-pass valve over the feed/effluent heat exchanger, or directly to a trim heater (e.g. to the fuel input to a fired heater), as visualized in FIG. 2. Other control actions are also possible. Since fresh catalyst may be very active, the optimal initial reaction temperature can be very low to ensure optimal yield.

Operating the reactor at a low inlet temperature of the oxygenate feed stream resulting in a low average bed temperature throughout the cycle indeed also results in a lower irreversible catalyst deactivation rate, since the rate of dealumination is favored at high temperature. In that way, the invention also prolongs the ultimate catalyst lifetime. Besides the positive long-term effect on catalyst lifetime, also the cycle lengths are surprisingly prolonged significantly by the invention.

The average bed temperature can be as low as 250° C. The temperature increase over the catalyst bed would typically be in the aforementioned range.

In an embodiment of the invention, the inlet temperature of one or more feed streams is adjusted to between 220 and 370° C. in the conversion in step d.

Operating the gasoline reactors at lower methanol conversion indeed results in a higher methanol concentration in the process condensate. To avoid the increased cost of the waste water unit associated with the removal of the increased methanol, the unconverted oxygenates are recovered and recirculated back to the synthesis process, e.g. by means of a process condensate stripper, instead of lost in the process condensate which is sent to water treatment system. The process of recovering methanol from the process condensate, before it is sent to the waste water treatment system, is not essential for the invention, but is still an important supplement, since it limits the capital cost of the waste water system, and further increases the overall production to consumption ratio even further.

If the process is performed in more than one conversion reactors, it is preferred that the conversion reactors are operated in parallel or in series.

Even if the invention is in more detail described for the use of methanol as oxygenate compound, other oxygenates such as dimethyl ether, ethanol and propanol or mixtures thereof are suitable in the process according to the invention.

EXAMPLE 1

The invention was tested in pilot plant operation applying 5 kilograms of catalyst in an adiabatic fixed bed reactor.

Two separate experiments were conducted. In the first experiment, the catalyst was operated in accordance with the invention. In the second experiment the catalyst (fresh catalyst from same batch) was operated according to standard operation, i.e. at constant temperatures inlet and outlet of the reactor ($T_{in}$=350° C.). Except the temperature, all other process conditions were identical for the two experiments. In both experiments, the methanol concentration in the reactor effluent was measured continuously using online GC. However, in case of the "inventive process", the GC measurements were used as input to a feed-back controller, controlling the methanol slip at the specified set-point by adjusting continuously the inlet temperature of the feed stream. The set-point was chosen to be 425 vol. ppm corresponding to a methanol conversion of about 99.5% at the conditions.

Figure 3:
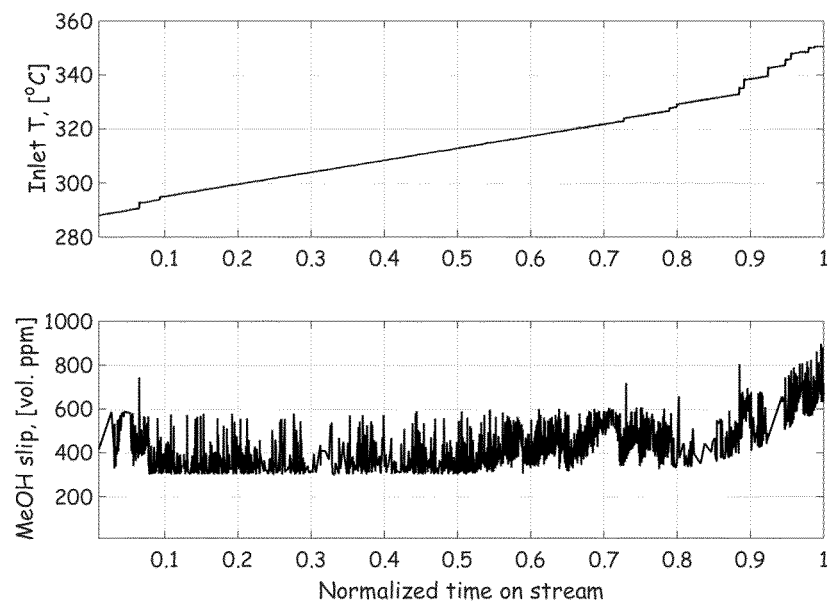
FIG. 3: Examples showing the different operating strategies. A: is the inventive process providing optimal production, whereas B is the conventional process of operating the reactor at constant temperature. Operation data shown, is obtained from pilot operation. Note that in case of the improved operation the cycle length is surprisingly increased with more that 25%.
Figure 3:
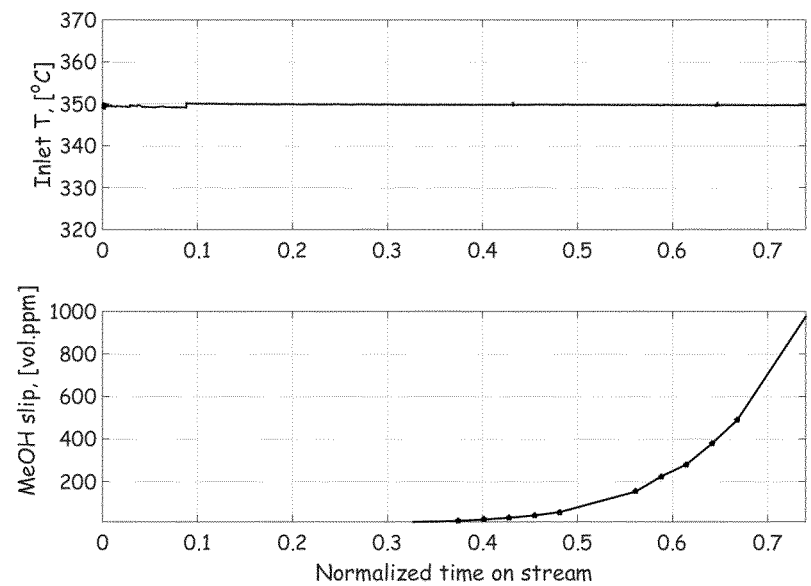

The inlet temperature and the corresponding methanol slip measured for the two separate experiments are shown in FIG. 3 as function of the time on stream. For both experiments, the cycle lengths were defined as the point in time, where the methanol slip no longer could be controlled at the given conditions. The longest cycle period was obtained for the "inventive process". The cycle length obtained for this process exceeded the "standard process" with more than 25%. The time on stream in FIG. 3 have been normalized with the longest cycle length which was obtained for "the inventive process".

In case of the "standard operation", the high temperature ensures close to 100% conversion (close to zero methanol slip measured–below detection limit). After approximately 75% of the normalized time on stream, the methanol conversion drops, and the slip increase in an uncontrolled fashion, thereby ending the cycle.

In case of the "inventive process", the choice of the low reactor temperature result in a methanol slip close to the set-point immediately. Since the reaction zone at low temperature is located closer to the outlet of the catalyst bed, the methanol slip is more influenced by the coking of the catalyst relative to the standard operation. Therefore, the feed-back controller continuously increase the inlet temperature to target the specified set-point. Late in the cycle, the methanol slip increases more and more aggressively, and the temperature controller counteract this tendency by increasing the inlet temperature at a faster rate. After it reaches its maximum temperature (here chosen arbitrarily to be 350° C.), the cycle is terminated once the slip increases, with a certain margin, above the specified setpoint. As observed from the data, the cycle length is significantly prolonged by the invention. The explanation could be a reduced coking rate due to lower average reaction temperature, or it could be related to the differences in how the entire catalyst bed is utilized when variating the reaction temperature.

Figure 4:
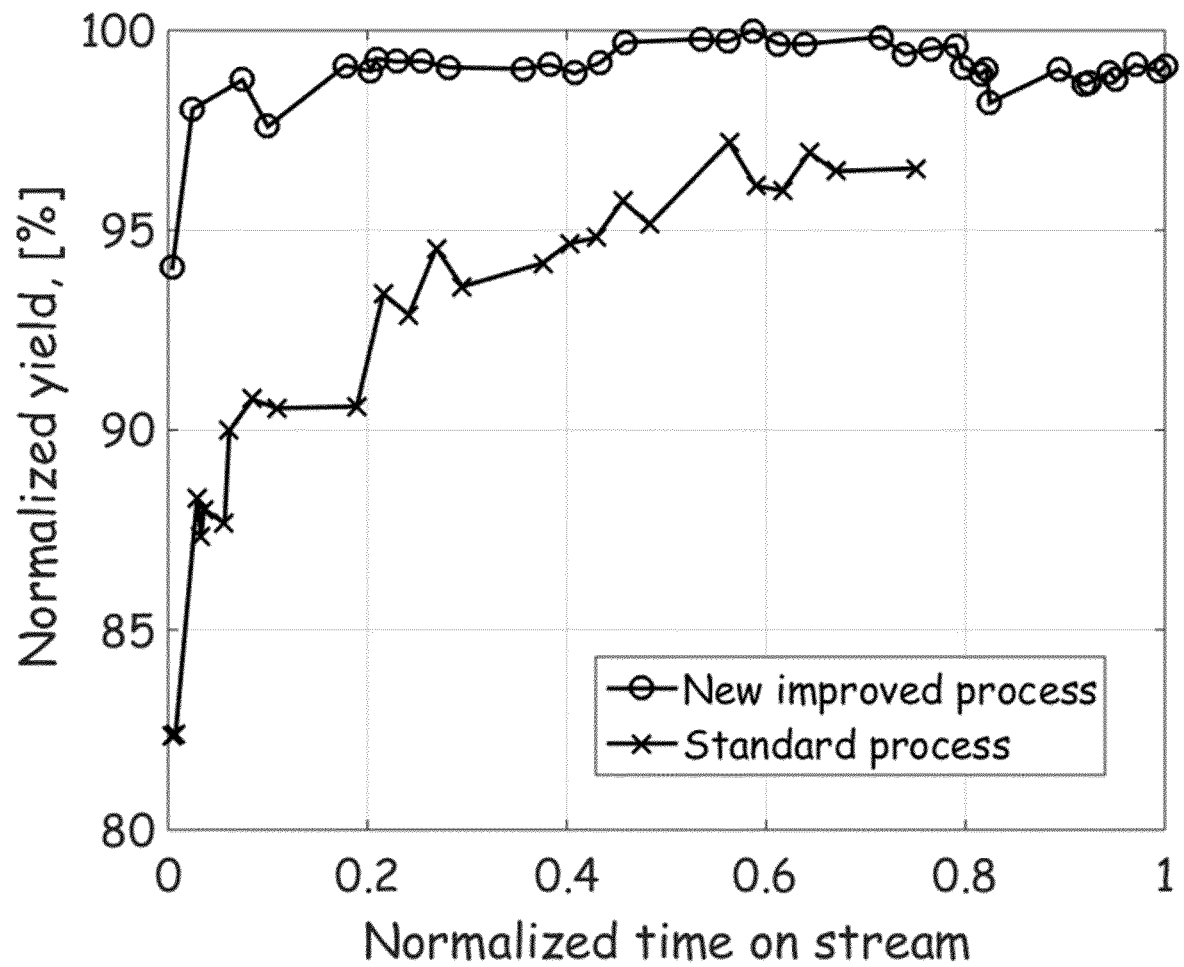
FIG. 4: Measured gasoline yields obtained for the new improved version and the standard process. Since the improved process operates closer to the optimal production point (compromise between conversion and selectivity), the yield is significantly higher already from start of cycle.

The measured gasoline yields for the two experiments are provided on FIG. 4. The graph shows the normalized yields (normalized by the highest yield value obtained) as function of the normalized time on stream. The difference in measured yields between the two operating cases are significant, and clearly illustrates the benefit of operating the catalyst away from full methanol conversion, as otherwise stated as normal practice. The increase in yield as function of time, which also is observed for the "standard operation" is caused by coking. As the catalyst cokes, the selectivity to the cracking reactions decrease.

Figure 5:
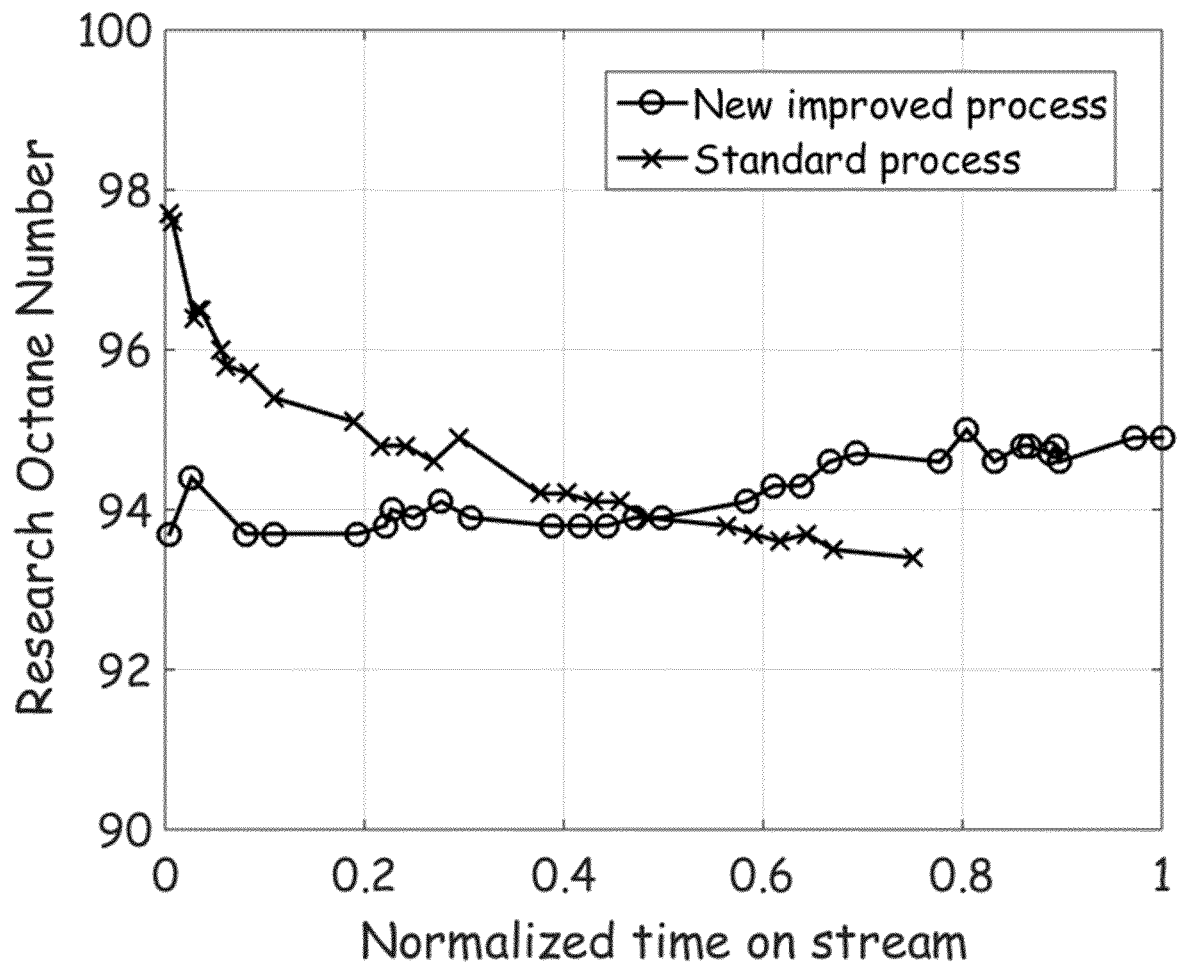
FIG. 5: Measured gasoline octane numbers for the produced gasoline in the two cases for comparison. For the improved method, the octane number is initially lower, but is surprisingly maintain at its sufficiently high value throughout the cycle. The improved process thus provides more stable product with sufficiently high octane number.

Besides optimization of the gasoline yield, the invention also results in a more stable product distribution. Under constant operating conditions, as in the "standard operation", the product distribution will change significantly over time due to change in selectivity caused by the catalyst coking. This also mean, that the product properties, such as the octane numbers, will change over time due to the catalyst coking, which is not desired in commercial application. However, the invention provides a "status quo" effect due to the continuous control of the methanol conversion. The measured Research Octane Number (RON) measured during both experiments are depictured as function of normalized time on stream in FIG. 5. Even though, the measured RON starts at a lower level, compared to the "standard operation", the "inventive process" indeed maintains the octane level throughout the entire cycle period.

The invention claimed is:

1. Process for the conversion of oxygenates to $C_{5+}$ hydrocarbons boiling in the gasoline boiling range, comprising the steps of continuously
    a) providing one or more feed streams of one or more oxygenate compounds;
    b) heating the one or more feed streams to an inlet temperature of one or more downstream conversion reactors;
    c) introducing the one or more heated feed stream into inlet of the one or more conversion reactors;
    d) converting in the one or more conversion reactors the one or more heated feed stream in presence of catalyst to a converted oxygenate product comprising $C_{5+}$ hydrocarbons;
    e) withdrawing from the one or more conversion reactors the converted oxygenate product;
    f) determining at outlet of the one or more conversion reactors amount of the one or more unconverted oxygenate compounds in the withdrawn converted oxygenate product; and
    g) separating the converted oxygenate product into a $C_{4-}$ hydrocarbon fraction, a fraction with the $C_{5+}$ hydrocarbons boiling in the gasoline boiling range and a fraction comprising water and the one or more unconverted oxygenate compounds, wherein the inlet temperature of the one or more feed streams in step b is continuously adjusted to maintain a constant amount of the one or more unconverted oxygenate compounds as determined in step f, and to maintain a constant level of conversion of the one or more oxygenate compounds of between 95% to 99.9%.

2. The process of claim 1, wherein the inlet temperature of the one or more feed streams in step b is continuously increased to maintain a conversion of the one or more oxygenate compounds at a constant amount.

3. The process of claim 1, wherein the inlet temperature of the one or more feed streams in step b is continuously decreased to maintain a conversion of the one or more oxygenate compounds at a constant amount.

4. The process of claim 1, wherein the inlet temperature of the one or more feed streams in step b is continuously increased between start of run and end of run of the conversion of the one or more heated feed streams in step d.

5. The process of claim 1, wherein the inlet temperature of the one or more feed streams is adjusted to between 220 and 370° C. at start of run of the conversion in step d.

6. The process of claim 1, wherein the inlet temperature of the product withdrawn from the one or more conversion reactors in step e in feed effluent heat exchanger(s) and/or by means of trim heater(s).

7. The process of claim 1, wherein the one or more unconverted oxygenates compounds are recovered from the fraction comprising water and recirculated back to step a.

8. The process of claim 1, wherein the one or more conversion reactors are operated in parallel or in series.

9. The process of claim 1, wherein the one or more oxygenate compounds comprise methanol or mixtures of dimethyl ether and methanol.

10. The process of claim 1, wherein the one or more oxygenate compounds comprise dimethyl ether, ethanol and propanol or mixtures thereof.

* * * * *

UNITED STATES PATENT AND TRADEMARK OFFICE
CERTIFICATE OF CORRECTION

| | |
|---|---|
| PATENT NO. | : 11,060,036 B2 |
| APPLICATION NO. | : 17/040863 |
| DATED | : July 13, 2021 |
| INVENTOR(S) | : Martin Dan Palis Sørensen |

It is certified that error appears in the above-identified patent and that said Letters Patent is hereby corrected as shown below:

In the Claims

Claim 6, Column 6, Line 39, cancel:
"6. The process of claim 1, wherein the inlet temperature of the product withdrawn from the one or more conversion reactors in step e in feed effluent heat exchanger(s) and/or by means of trim heater(s)."
And insert the following:
--6. The process of claim 1, wherein the inlet temperature of the one or more feed streams is adjusted by indirect heat exchange with the converted oxygenate product withdrawn from the one or more conversion reactors in step e in feed effluent heat exchanger(s) and/or by means of trim heater(s).--

Signed and Sealed this
Tenth Day of May, 2022

Katherine Kelly Vidal
*Director of the United States Patent and Trademark Office*